(12) United States Patent
Stilborn et al.

(10) Patent No.: US 10,377,290 B2
(45) Date of Patent: Aug. 13, 2019

(54) SPOUT AUTOROTATE FOR A GRAIN CART

(71) Applicant: Brandt Agricultural Products Ltd., Regina (CA)

(72) Inventors: Mitch Stilborn, Regina (CA); Greg Thomson, Emerald Park (CA)

(73) Assignee: Brandt Agricultural Products Ltd., Regina (CA)

( * ) Notice: Subject to any disclaimer, the term of this patent is extended or adjusted under 35 U.S.C. 154(b) by 162 days.

(21) Appl. No.: 15/445,151

(22) Filed: Feb. 28, 2017

(65) Prior Publication Data

US 2018/0244477 A1    Aug. 30, 2018

(51) Int. Cl.
| | |
|---|---|
| *B60P 1/36* | (2006.01) |
| *B60P 1/42* | (2006.01) |
| *A01D 90/10* | (2006.01) |
| *B65G 41/00* | (2006.01) |
| *B65G 43/00* | (2006.01) |
| *B60P 1/40* | (2006.01) |

(52) U.S. Cl.
CPC ............... *B60P 1/42* (2013.01); *A01D 90/10* (2013.01); *B65G 41/002* (2013.01); *B65G 43/00* (2013.01); *B60P 1/40* (2013.01)

(58) Field of Classification Search
CPC ........................................................ B60P 1/36
USPC .......... 414/307, 315, 323, 523; 700/13, 213, 700/229, 230, 298
See application file for complete search history.

(56) References Cited

U.S. PATENT DOCUMENTS

| | | | |
|---|---|---|---|
| 3,994,512 | A | 11/1976 | Parker et al. |
| 5,013,208 | A | 5/1991 | Grieshop |
| 5,100,281 | A | 3/1992 | Grieshop |
| 5,108,249 | A | 4/1992 | Kinzenbaw et al. |
| 5,139,314 | A | 8/1992 | Deckler |
| 5,340,265 | A | 8/1994 | Grieshop |
| 5,407,137 | A | 4/1995 | Linde et al. |
| 5,409,344 | A | 4/1995 | Tharaldson |
| 5,477,937 | A | 12/1995 | Chagnon |
| 5,516,253 | A | 5/1996 | Linscheid et al. |
| 5,538,388 | A | 7/1996 | Bergkamp et al. |
| 5,615,990 | A | 4/1997 | Grieshop |
| 5,655,872 | A | 8/1997 | Plotkin |

(Continued)

OTHER PUBLICATIONS

U.S. Appl. No. 15/445,083, filed Feb. 28, 2017.
U.S. Appl. No. 15/445,160, filed Feb. 28, 2017.

*Primary Examiner* — Saul Rodriguez
*Assistant Examiner* — Willie Berry, Jr.
(74) *Attorney, Agent, or Firm* — Frost Brown Todd LLC (57) ABSTRACT

A grain cart is provided that automatically rotates a spout of an auger assembly out of the way of a storage hopper when the auger assembly is folded into a transport position. The grain cart can include a storage hopper and an auger assembly to discharge particulate material from the storage hopper out of the grain cart. The auger assembly has a lower auger section and an upper auger section. A discharge assembly is pivotally attached to a discharge end of the upper auger section. To put the auger assembly in the transport assembly, the upper auger section is pivoted adjacent to the lower auger section. A cross-over electrical connection electrically connects a fold electrical connection and a pivot electrical connection, to cause the discharge assembly and spout to be pivoted towards a front of a grain cart when the auger assembly is folded into the transport position.

14 Claims, 11 Drawing Sheets

(56) References Cited

U.S. PATENT DOCUMENTS

| | | |
|---|---|---|
| 5,659,470 A | 8/1997 | Goska et al. |
| 5,666,793 A | 9/1997 | Bottinger |
| 5,733,094 A | 3/1998 | Bergkamp et al. |
| 5,788,055 A | 8/1998 | Stewart et al. |
| 5,842,920 A | 12/1998 | Siepker |
| 5,876,176 A | 3/1999 | Smith et al. |
| 5,888,044 A | 3/1999 | Baskerville |
| 5,904,365 A | 5/1999 | Dillon |
| 5,980,189 A | 11/1999 | Rubner |
| 6,017,182 A | 1/2000 | Grieshop |
| 6,042,326 A | 3/2000 | Thomas et al. |
| 6,095,616 A | 8/2000 | Grieshop |
| 6,131,691 A | 10/2000 | Morch |
| 6,135,484 A | 10/2000 | Lauronen et al. |
| 6,216,071 B1 | 4/2001 | Motz |
| 6,237,811 B1 * | 5/2001 | Ford ............ A47J 31/401 222/129.1 |
| 6,261,050 B1 | 7/2001 | Kuhns |
| 6,296,435 B1 | 10/2001 | Wood et al. |
| 6,308,976 B1 | 10/2001 | Mitchell |
| 6,434,462 B1 | 8/2002 | Bevly et al. |
| 6,488,114 B1 | 12/2002 | McMahon et al. |
| 6,497,546 B2 | 12/2002 | Wood et al. |
| 6,591,875 B2 | 7/2003 | Zaun et al. |
| 6,632,135 B2 | 10/2003 | Matousek et al. |
| 6,682,416 B2 | 1/2004 | Behnke et al. |
| 6,767,174 B2 | 7/2004 | Cresswell |
| 6,776,569 B1 | 8/2004 | McMahon et al. |
| 6,893,202 B2 | 5/2005 | Hunt |
| 6,943,824 B2 | 9/2005 | Alexia et al. |
| 7,010,425 B2 | 3/2006 | Gray et al. |
| 7,034,666 B2 | 4/2006 | Knutson |
| 7,099,760 B2 | 8/2006 | Lin et al. |
| 7,134,830 B2 | 11/2006 | Wood |
| 7,191,061 B2 | 3/2007 | McKay et al. |
| 7,198,337 B2 | 4/2007 | Deckler et al. |
| 7,225,060 B2 | 5/2007 | O'Connor et al. |
| 7,287,639 B2 | 10/2007 | Brandt |
| 7,381,131 B1 | 6/2008 | Harpole |
| 7,494,409 B2 | 2/2009 | Voss et al. |
| 7,540,700 B2 | 6/2009 | Hook |
| 7,543,365 B2 | 6/2009 | Van Mill et al. |
| 7,756,624 B2 | 7/2010 | Diekhans et al. |
| 7,810,823 B2 | 10/2010 | Van Mill et al. |
| 8,047,757 B1 * | 11/2011 | Wood ............ A01D 90/10 198/668 |
| 8,167,527 B2 | 5/2012 | Kinzenbaw |
| 8,260,499 B2 | 9/2012 | Boydell |
| 8,328,497 B2 | 12/2012 | Wood |
| 8,544,574 B2 | 10/2013 | Fegley et al. |
| 8,565,984 B2 | 10/2013 | Mayfield et al. |
| 8,585,343 B2 | 11/2013 | Wood |
| 8,684,649 B2 | 4/2014 | Redekop |
| 8,702,368 B2 | 4/2014 | Van Mill et al. |
| 9,039,340 B2 | 5/2015 | Van Mill et al. |
| 9,102,478 B2 | 8/2015 | Van Mill et al. |
| 2004/0184905 A1 | 9/2004 | Kinzenbaw et al. |
| 2010/0209223 A1 | 8/2010 | Van Mill et al. |
| 2010/0254792 A1 | 10/2010 | Kinzenbaw |
| 2011/0095503 A1 | 4/2011 | Dodd et al. |
| 2011/0164952 A1 | 7/2011 | Hollenberg |
| 2011/0175322 A1 | 7/2011 | McMahon et al. |

\* cited by examiner

SPOUT AUTOROTATE FOR A GRAIN CART

FIELD OF THE INVENTION

The present invention relates to a grain cart and more particularly to components and a method of automatically rotating a spout on an auger assembly of the grain cart when the auger assembly is being folded.

BACKGROUND

Grain carts are typically used to transfer grain or other crop material from a combine harvester to a grain truck or bin. The grain cart typically comprises a storage hopper for crop material, an auger assembly for emptying crop material from the storage hopper and a set of ground wells so that the grain cart can be towed. A tractor is commonly used to tow the grain cart and the auger assembly of the grain cart can be driven off the power take off (PTO) of the tractor (although hydraulics, etc. could also be used to power the auger assembly).

In use, the grain cart is towed by the tractor to a combine harvester where the crop material is unloaded from the combine harvester into the grain cart. With the crop material loaded into the storage hopper of the grain cart, the tractor can tow the grain cart to a truck, trailer, storage bin, etc. and use the auger assembly to unload the crop material from the grain cart into the truck, trailer, storage bin, etc.

Grain carts typically have an operating position and a transport position. In the operating position, the auger assembly is unfolded so that the upper end of the auger assembly extends out past the side of the grain cart making it easier to discharge crop material out of the grain cart into an adjacent truck, trailer, storage bin, etc. In the transport position, the auger assembly is folded so that the upper section of the auger assembly is pivoted more parallel with the lower auger section so that the auger assembly does not extend by much or at all past the side of the grain cart, making it easier to maneuver the grain cart without fear of hitting something with the extended auger.

However, on some grain carts, a spout on the end of the auger assembly can be rotated to allow an operator to direct the crop material being discharged out of the grain cart and particularly the auger assembly a bit to aid in aiming the discharging crop material into the adjacent truck, trailer, storage bin, etc. Because the auger assembly is placed adjacent to the front of the storage hopper, if the spout is rotated towards the back of the grain cart when the auger assembly is folded, the spout can hit the storage hopper during the folding and can cause damage to the spout and/or the storage hopper.

Ideally, an operator will remember to rotate the spout out of the way, but this may not always happen especially when the operator is moving load after load in the grain cart or the operator may think the spout is rotated out of the way, but may not see or realize that it is in position to contact the storage hopper.

It is therefore desirable to have the spout automatically rotate out of the way when an operator folds the auger assembly for transport. While there have been previous attempts to automate this, such attempts have typically been quite complex and required a lot of modifications to a typical grain cart.

BRIEF SUMMARY

In a first aspect, a grain cart is provided. The grain cart can include a frame, ground wheels rotatable attached to the frame, a hitch assembly attached to a front end of the frame, a storage hopper provided on the frame, and an auger assembly operatively connected to the storage hopper to discharge particulate material from the storage hopper out of the grain cart. The auger assembly can include a lower auger section having an intake end and a top end, an upper auger section having a bottom end and a discharge end, a discharge assembly pivotally attached to the discharge end of the upper auger section, a spout provided on the discharge assembly, a pivot actuator connected to the discharge assembly to pivot the discharge assembly and the spout relative to the discharge end of the upper auger section, a pivot hinge pivotally connected to the upper auger section to pivot the upper auger section from an operating position coaxial with the lower auger section to a transport position with the upper auger section pivoted towards the lower auger section and a fold actuator operably connected to the upper auger section to pivot the upper auger section around the pivot hinge. The grain cart can also have an auger in switch, a spout pivot front switch, a first fold electrical connection electrically connected between the auger in switch and a fold solenoid valve, the fold solenoid valve operative, in response to an electrical voltage on the first fold electrical connection, to cause the fold actuator to pivot the upper auger section into the transport position, a first pivot electrical connection electrically connected between the spout pivot front switch and a spout pivot solenoid valve, the spout pivot solenoid valve operative, in response to an electrical voltage on the first pivot electrical connection, to cause the pivot actuator to pivot the discharge assembly towards a front of the grain cart and a cross-over electrical connection electrically connecting the first fold electrical connection and the first pivot electrical connection. When a voltage is supplied on the first fold electrical connection to the fold solenoid valve, the cross-over electrical connection supplies the voltage to the first pivot electrical connection and the first pivot electrical connection supplies the voltage to a spout pivot solenoid valve.

In a second aspect, a method of modifying a grain cart to automatically rotate a spout towards a front of the grain cart when an auger assembly is being folded into a transport position is provided. The method can include providing a grain cart having: a first fold electrical connection electrically connected between an auger in switch and a fold solenoid valve, the fold solenoid valve operative, in response to an electrical voltage on the first fold electrical connection, to cause a fold actuator to pivot an upper auger section into a transport position; and a first pivot electrical connection electrically connected between a spout pivot front switch and a spout pivot solenoid valve, the spout pivot solenoid valve operative, in response to an electrical voltage on the first pivot electrical connection, to cause a pivot actuator to pivot a discharge assembly containing a spout towards a front of the grain cart, and installing a cross-over electrical connection between the first fold electrical connection and the first pivot electrical connection to electrically connect the first fold electrical connection and the first pivot electrical connection.

DESCRIPTION OF THE DRAWINGS

A preferred embodiment of the present invention is described below with reference to the accompanying drawings, in which.

DETAILED DESCRIPTION OF THE ILLUSTRATED EMBODIMENTS

FIGS. 1-5 illustrates a grain cart 10. The grain cart 10 can have a frame 20, ground wheels 30, a hitch assembly 40, a storage hopper 60 for storing crop material and an auger assembly 80. Crop material can be loaded into the storage hopper 60 for transport to another location. When the grain cart 10 has been towed by a tow vehicle to another location, the auger assembly 80 can be used to unload the crop material from the storage hopper 60 on the grain cart 10.

The frame 20 can support the storage hopper 60 and the ground wheels 30 can be operatively attached to the frame 20. Typically, there are two ground wheels 30 per side. The hitch assembly 40 can be connected to the front of the frame 20 and the hitch assembly 40 can then be hitched to a tow vehicle, such as a tractor (not shown), to tow the grain cart 10.

The storage hopper 60 has an interior portion for storing crop material. The upper side walls 62 of the storage hopper 60 can be relatively vertical while the lower walls 64 can be angled inwards to direct crop material into a center portion 66 at the bottom of the hopper 60. Crop material loaded into the storage hopper 60 will be directed by gravity towards the center portion 66 in the bottom of the storage hopper 60.

Figure 6:
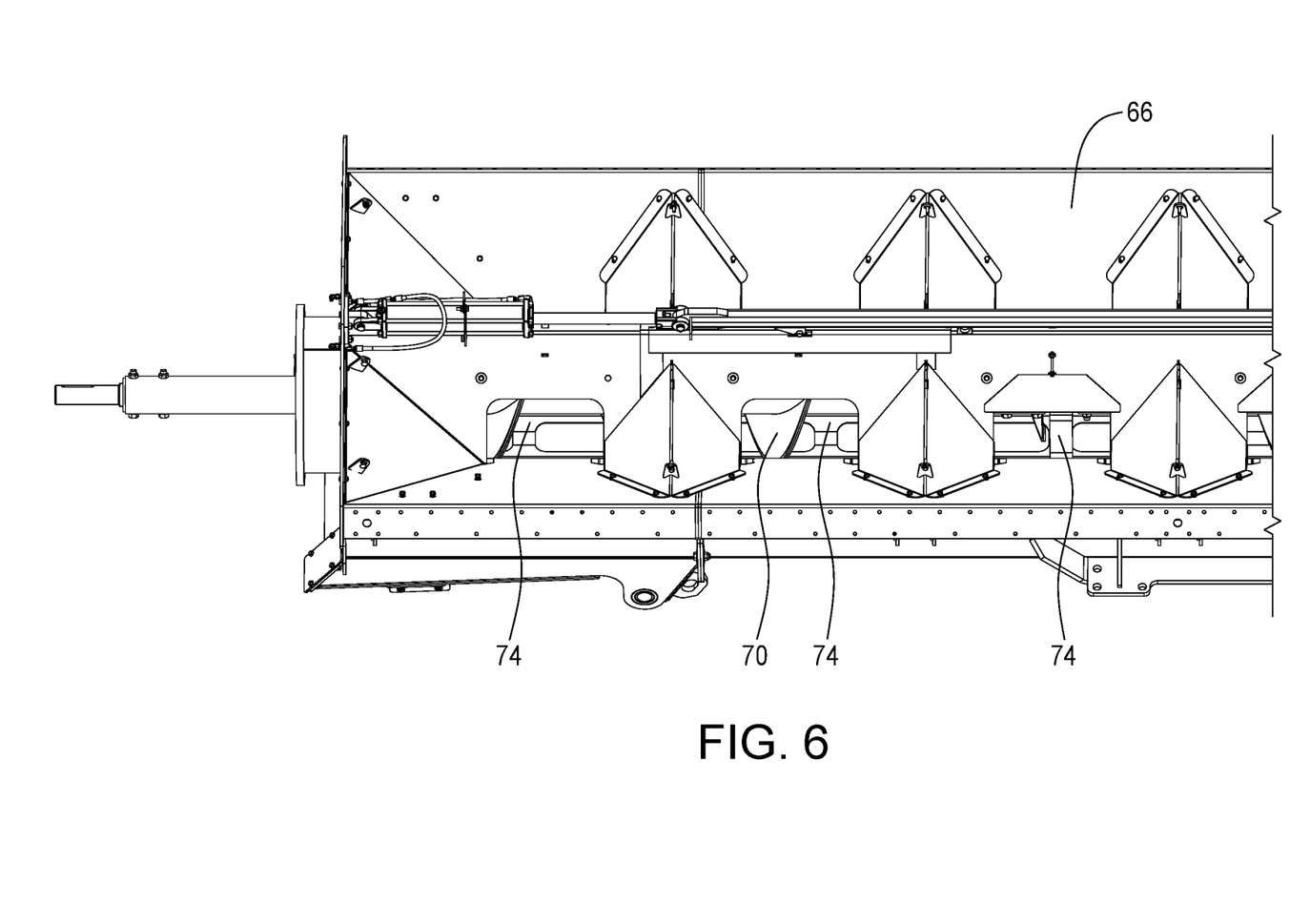
FIG. 6 is a partial view of the bottom of a storage hopper of a grain cart with openings to a transport assembly.
Figure 7:
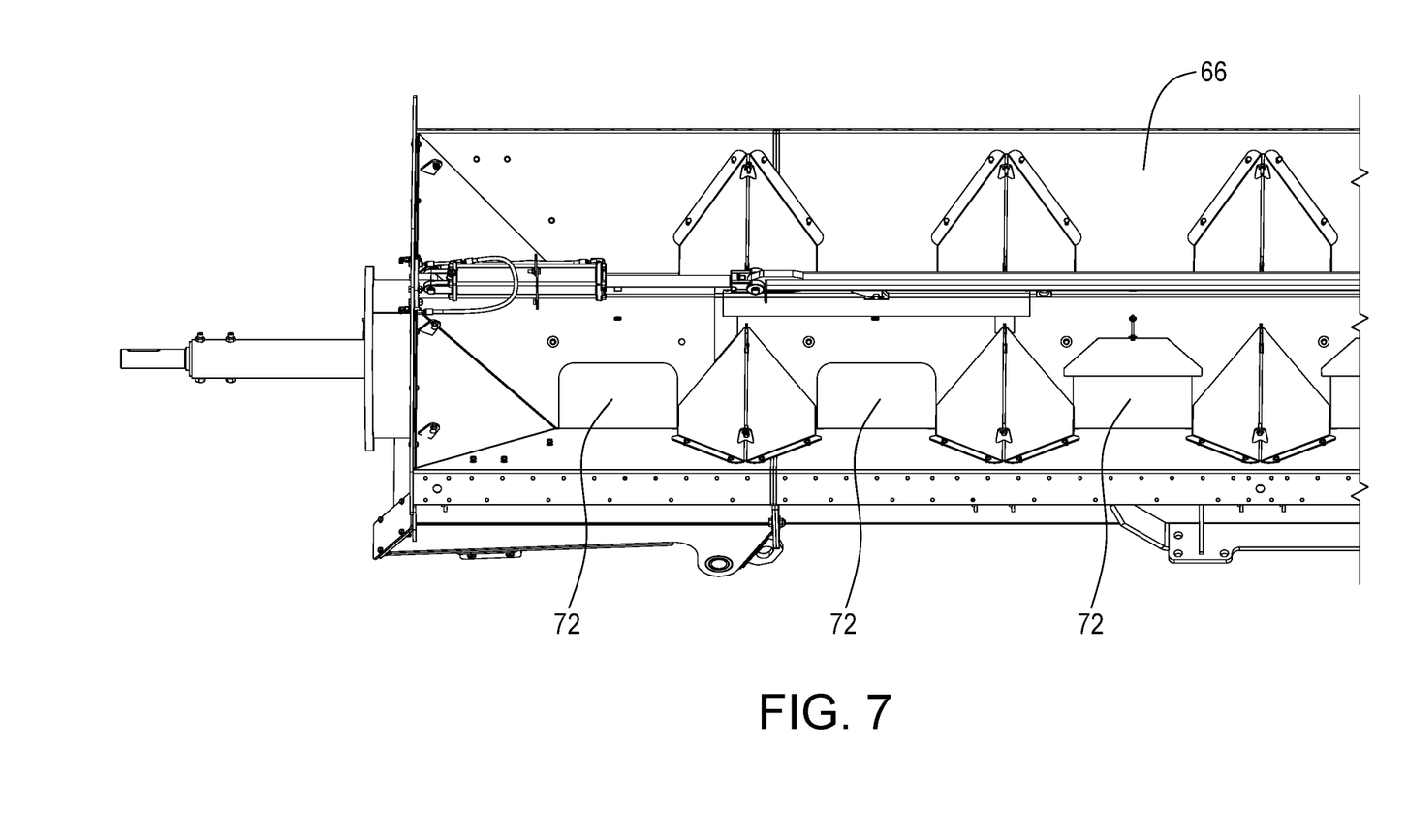
FIG. 7 is a partial view of the bottom of the storage hopper of FIG. 6 with the openings closed by gates.

FIGS. 6 and 7 shows the center portion 66 in the bottom of the storage hopper 60. Typically, a screen can be provided over the center portion 66, but it is not shown in these figures to better illustrate the components in the center portion 66. The center portion 66 of the storage hopper 60 can have a series of selectively openable gates 72 and corresponding openings 74 beneath the gates 72. Beneath these openings, a transport assembly 70 for moving crop material that has fallen through the openings 74 and into the transport assembly 70 can be provided. The transport assembly 70 can move crop material that has fallen through the openings 64 towards the front of the grain cart 10 and into the auger assembly 80. In the auger assembly 80, the crop material can be moved up the auger assembly 80 to be discharged out of the grain cart 10. The transport assembly 70 is typically a pair of augers and corresponding auger housings, but it can also be a conveyor belt, etc.

Figure 1:
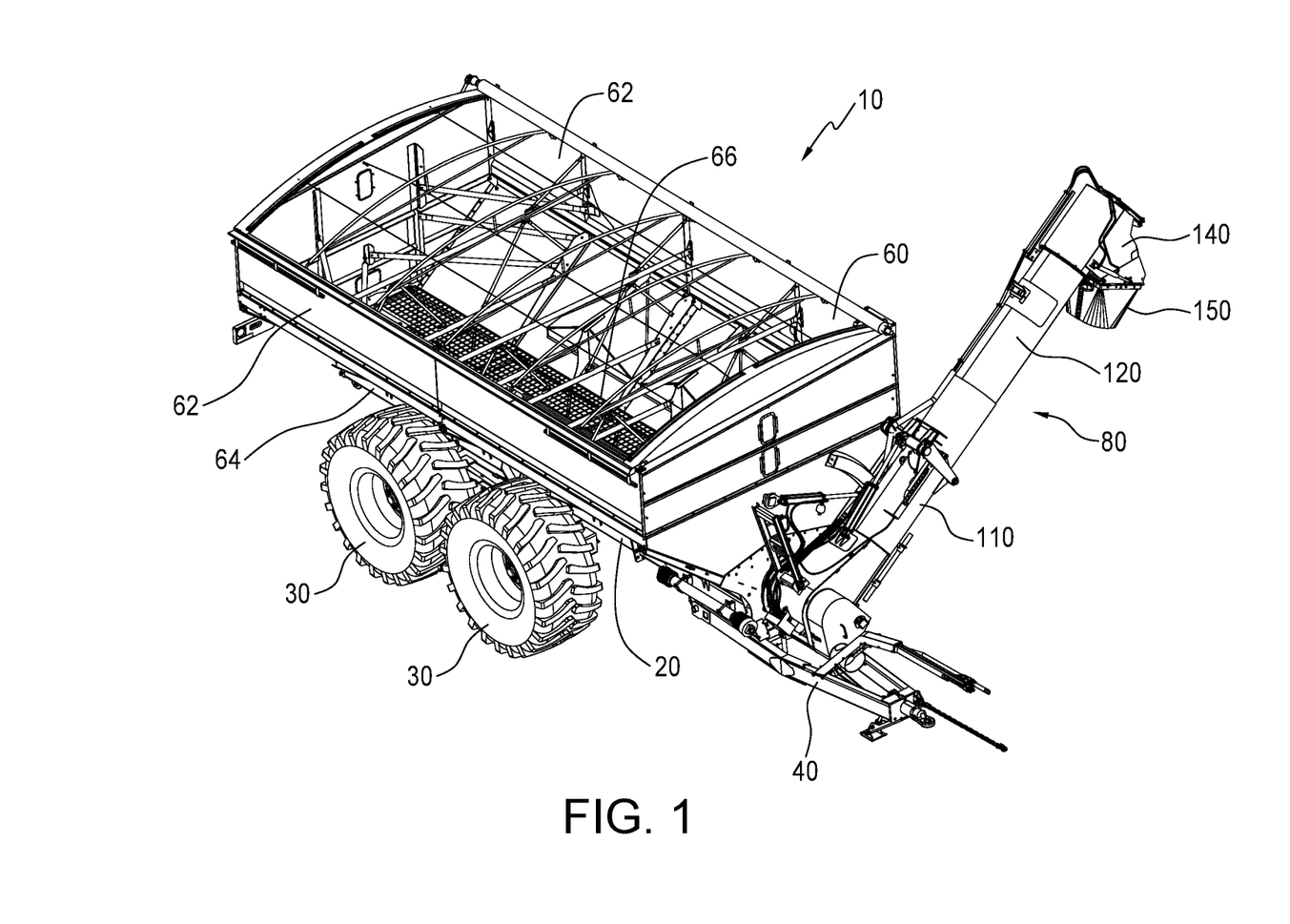
FIG. 1 is a perspective view of a grain cart.
Figure 2:
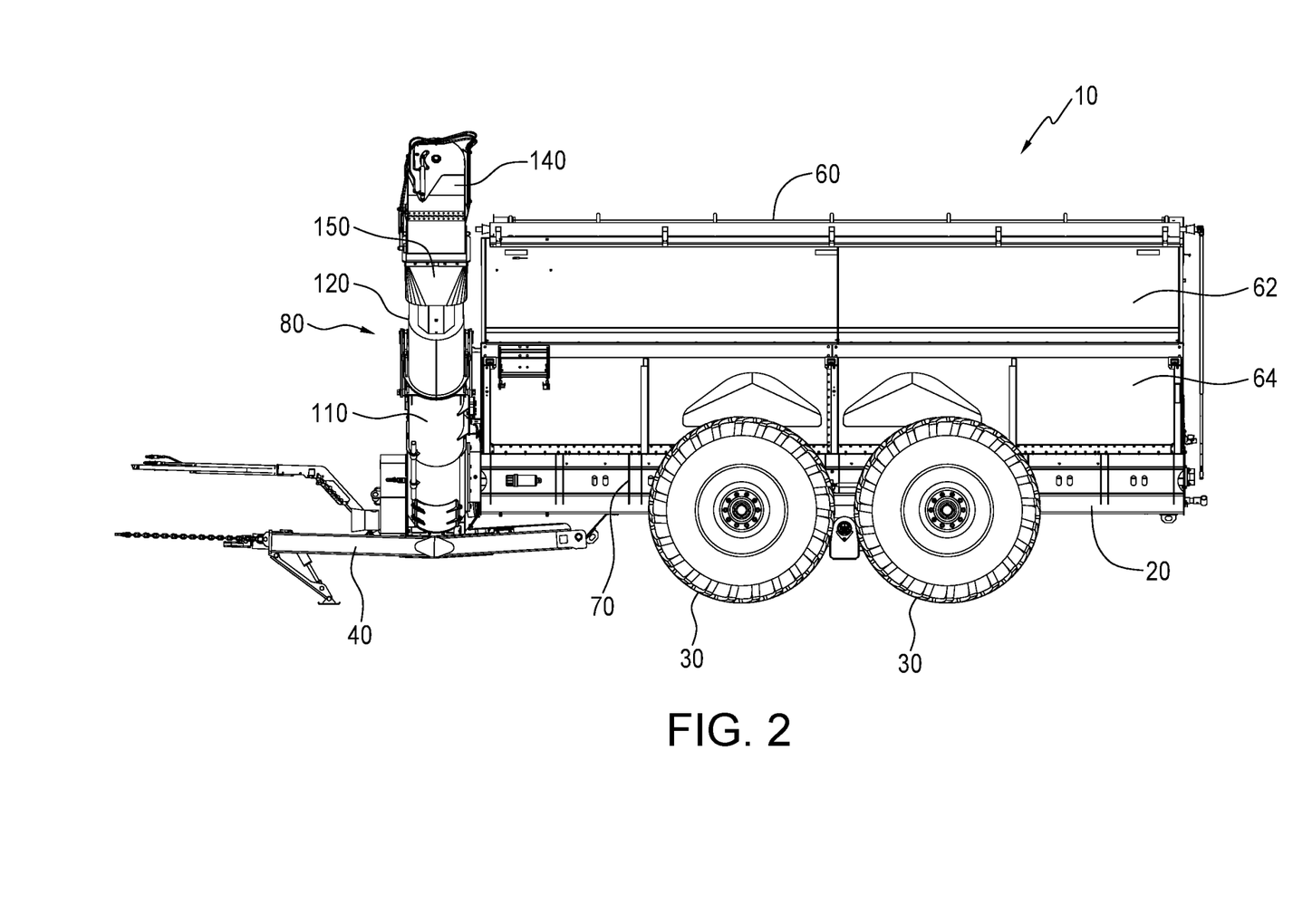
FIG. 2 is a side view of the grain cart of FIG. 1.
Figure 3:
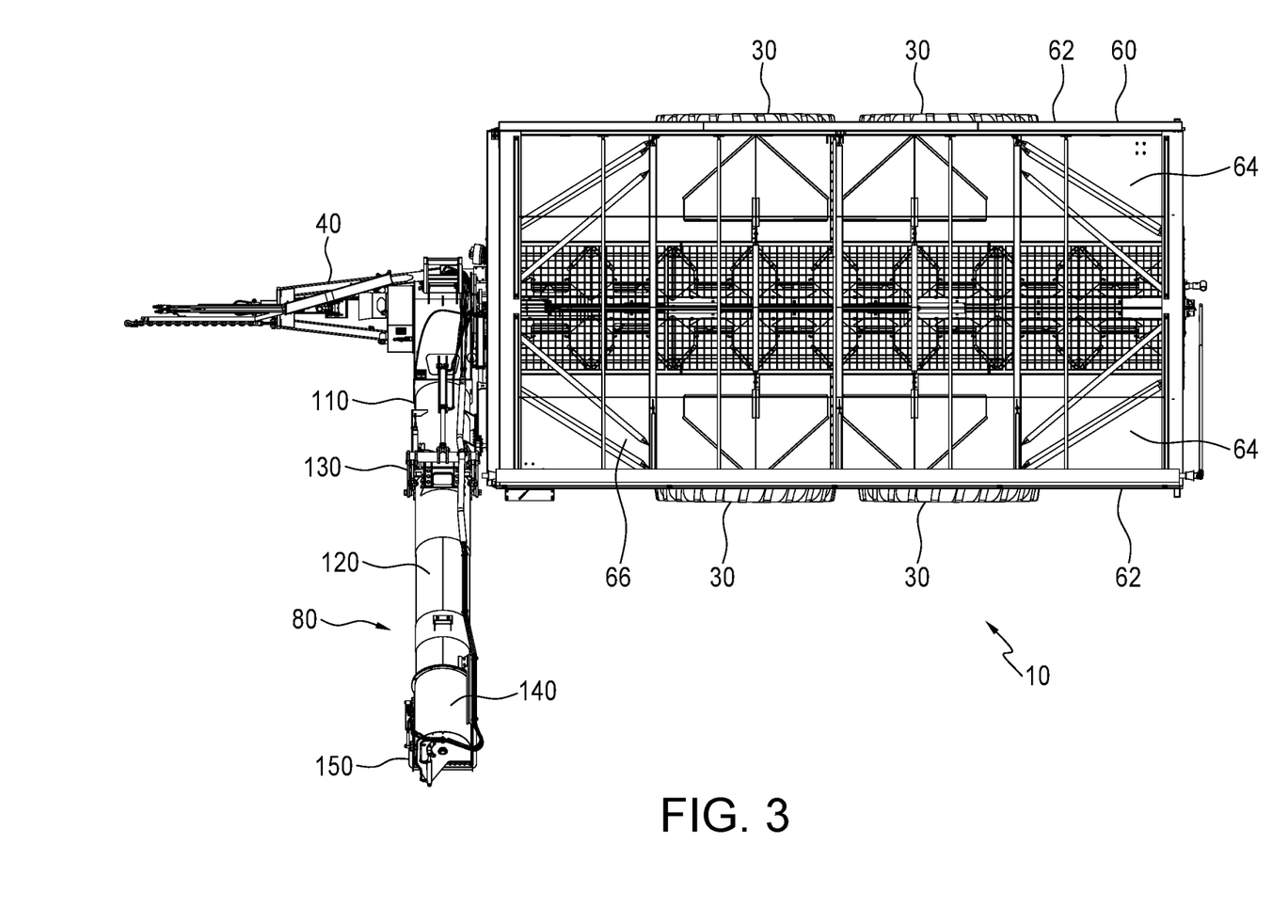
FIG. 3 is a top view of the grain cart of FIG. 1.
Figure 4:
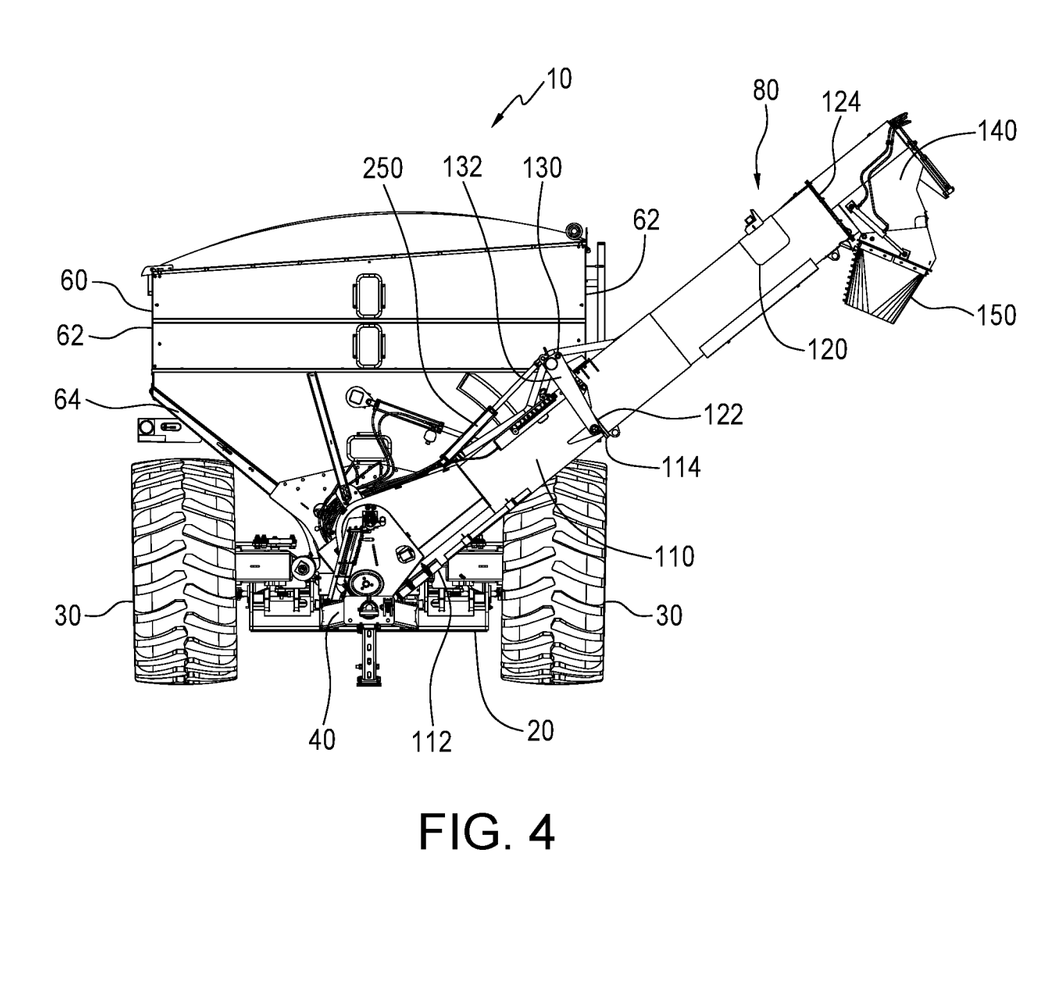
FIG. 4 is a front view of the grain cart of FIG. 1 with the auger assembly in an operating position.
Figure 5:
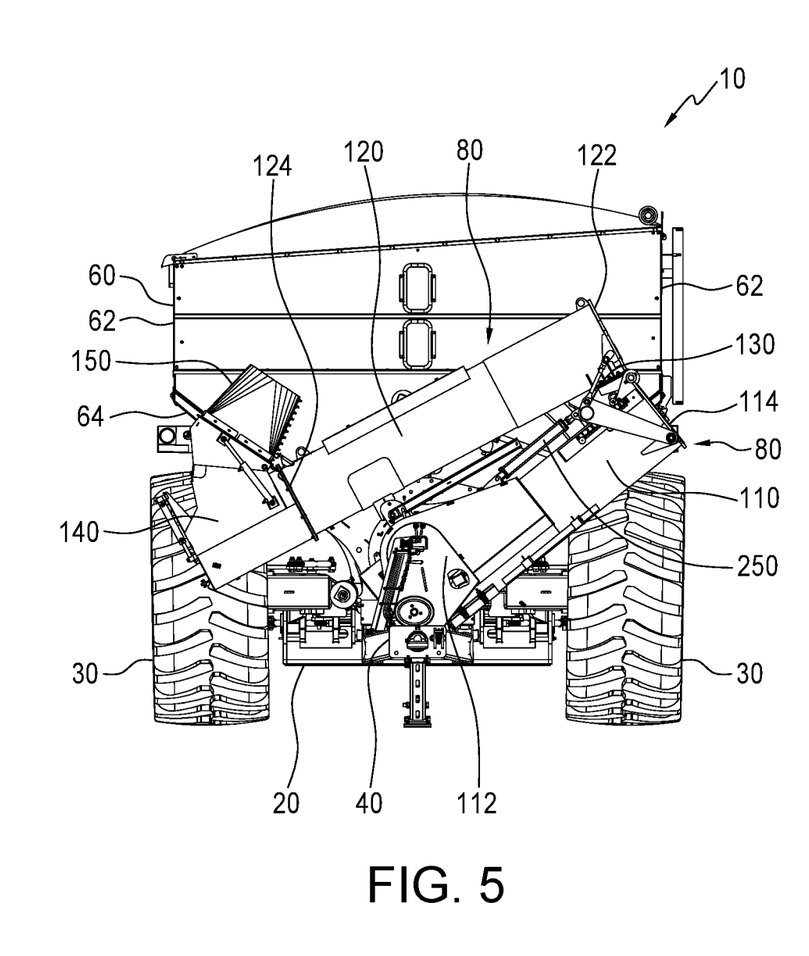
FIG. 5 is a front view of the grain cart of FIG. 1 with the auger assembly in a transport position.

FIG. 4 illustrates a front view of the grain cart 10 where the auger assembly 80 is in an operating position ready to discharge crop material out of the grain cart 10 and into an adjacent truck, trailer, storage bin, etc. and FIG. 5 shows the auger assembly 80 folded up into a transport position. The auger assembly 80 can have a lower auger section 110 and an upper auger section 120. When the auger assembly 80 is in the operating position, the upper auger section 120 and the lower auger section 110 can be positioned coaxial to one another.

The lower auger section 110 and the upper auger section 120 can each have a driveshaft and auger flighting within. The auger fighting in the lower auger section 110 will convey crop material up the lower auger section 110 and the auger fighting in the upper auger section 120. The lower auger section 110 can have an intake end 112 that is joined with the outlet of the transport assembly 70 so that crop material that has reached the end of the transport assembly 70 is conveyed into the intake end 112 of the lower auger section 110. This crop material will then be conveyed up the lower auger section 110 by the flighting in the lower auger section 110 until it reaches a top end 114 of the lower auger section 110. From the top end 114 of the lower auger section 110, the crop material can be transferred to the bottom end 122 of the upper auger section 120 and the flighting in the upper auger section 120 can convey the crop material up the upper auger section 120 to a discharge end 124 of the upper auger section 120.

The discharge end 124 of the upper auger section 120 can be pivotally connected to a discharge assembly 140. A spout 150 can be provided on the discharge assembly 140 to direct the flow of crop material exiting from the discharge end 140 of the upper auger section 120.

When the grain cart 10 is to be transported, especially over relatively long distances, the upper auger section 120 can be pivoted around a pivot hinge 130 so that the upper auger section 120 is no longer coaxial with the lower auger section 110, but rather, rotated around the hinge 130 to be placed closer to parallel with the lower auger section 110 and adjacent to the lower auger section 110 so that the upper auger section 120 does not extend significantly beyond the side of the storage hopper 60 when the grain cart 10 is in the transport position. The pivot hinge 130 can be operatively connected to the bottom end 124 of the upper auger section 120.

Figure 8:
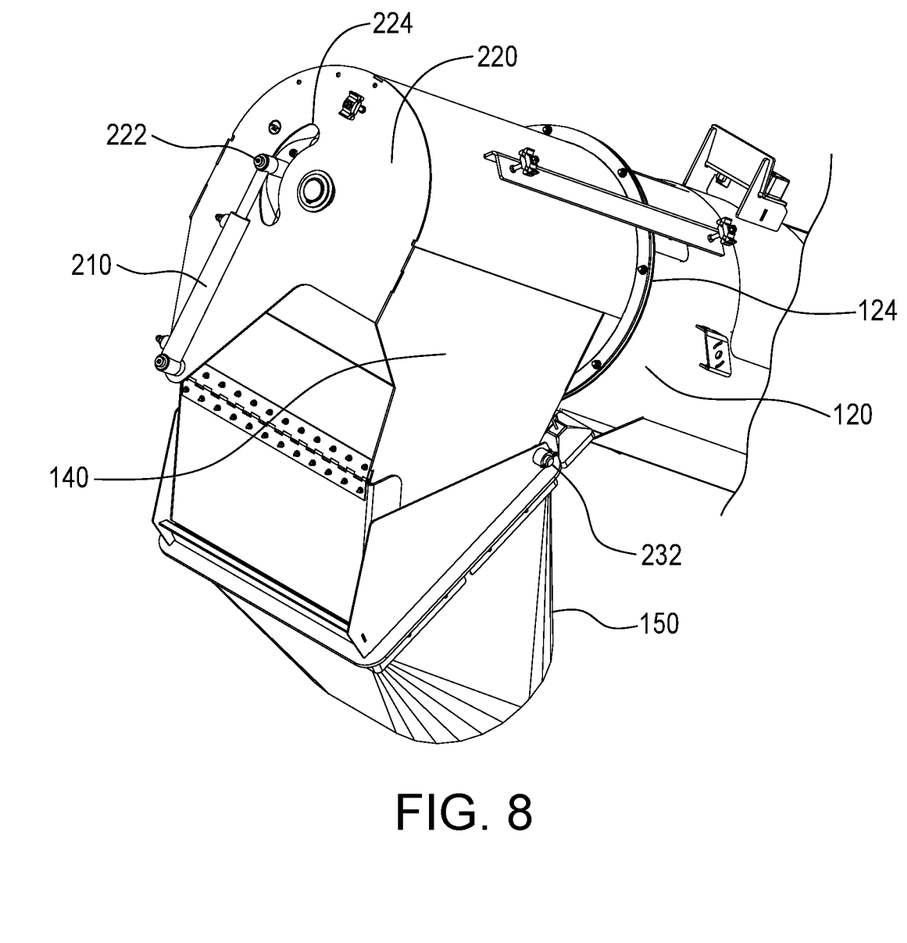
FIG. 8 is a perspective view of the discharge assembly of the grain cart of FIG. 1.
Figure 9:
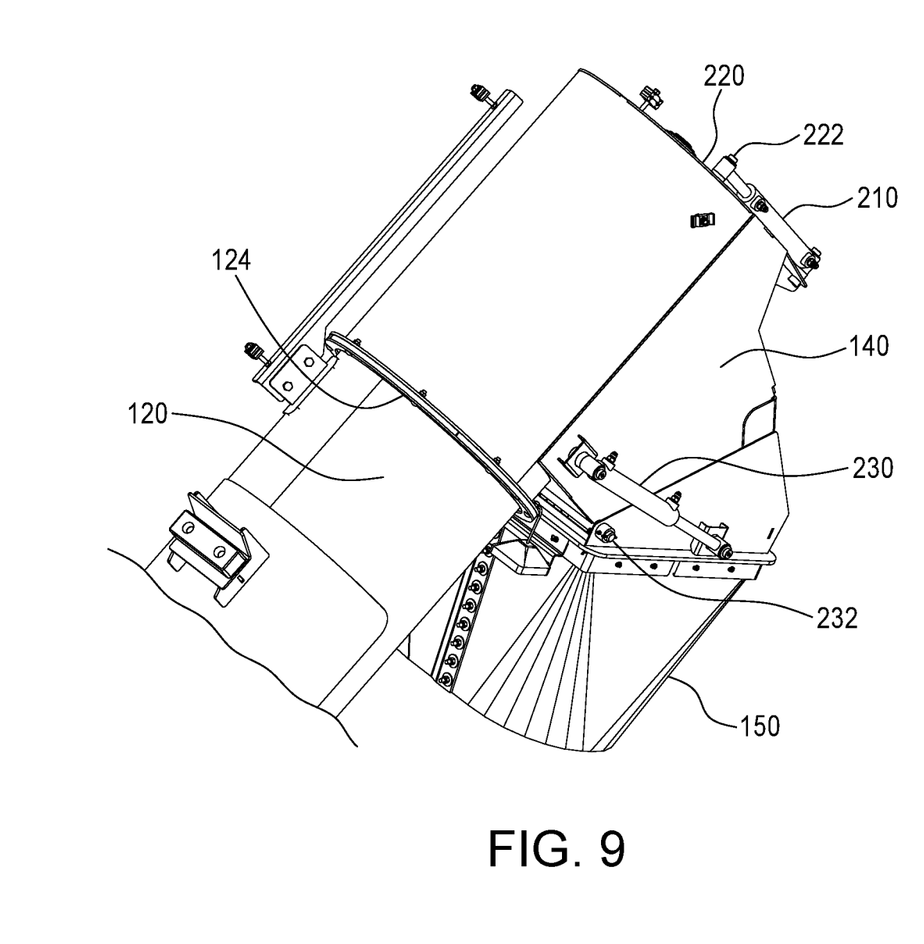
FIG. 9 is a side view of the discharge assembly of FIG. 8.

FIG. 8 illustrates the discharge assembly 140 connected to the discharge end 124 of the upper auger section 120. A pivot actuator 210, such as a hydraulic cylinder, can be provided to rotate the discharge assembly 140 relative to the upper auger section 120. The pivot actuator 210 can be connected at one end to a bracket 220 provided on the discharge assembly 140. The other end of the pivot actuator 210 can be connected to the upper auger section 120. In this case, a pin 222 passing through a curved aperture 224 in the bracket 220 can allow the pivot actuator 210 to rotate the discharge assembly 140 relative to the discharge end 124 of the upper auger section 120. When the pivot actuator 210 is extended or retracted, the pivot actuator 210 will move the bracket 220 relative to the pin 222 and therefore the upper auger section 120 causing the discharge assembly 140 to rotate relative to the upper auger section 120.

Because the spout 150 is attached to the discharge assembly 140, the spout 150 will be rotated in conjunction with the discharge assembly 140. This will allow an operator controlling the grain cart 10 to rotate the spout 150 and aim the crop material being discharged out of the spout 150.

A spout actuator 230, such as a hydraulic cylinder, can be provide between the discharge assembly 140 and the spout 150 to move the spout 150 relative to the discharge assembly 140 around pivot point 232.

Referring again to FIGS. 4 and 5, to put the auger assembly 80 in the transport position, a fold actuator 250, such as a hydraulic cylinder, can be provided connected between lower auger section 110 and the upper auger section 120. Referring again to FIG. 4, when the auger assembly 80 is in the operating position, the fold actuator 250 can be used to pull a fold bracket 132 attached to the upper auger section 120, which in turn will rotate the upper auger section 120 around the pivot hinge 130. This fold actuator 250 can continue to pull the fold bracket 132, until the upper auger section 120 is rotated to a position more parallel with the lower auger section 110 and adjacent to the lower auger section 110, as shown in FIG. 5. The auger assembly 80 will then be in the transport position.

To put the auger assembly 80 back into the operator position, the fold actuator 250 can be used to push the fold bracket 132 rotating the upper auger section 120 around the pivot hinge 130 until the upper auger section 120 is once again coaxial with the lower auger section 110.

However, if the discharge assembly 140 and the spout 150 is rotated relative to the upper auger section 120 so that the spout 150 is rotated back towards the rest of the grain cart 10, when the auger assembly 80 is being moved from the operating position to the transport position, the spout 150 can hit the storage hopper 60 as the upper auger section 120 is being rotated around the pivot hinge 130. To prevent this, the discharge assembly 140 should be rotated relative to the upper auger section 120 so that the spout 150 is pivoted towards the front of the grain cart 10 and away from the storage hopper 60 when the upper auger section 120 is pivoted into the transport position.

The operation of the grain cart 10 can be controlled by a control interface 300. Typically, the control interface 300 for the grain cart 10 is a joystick such as the one shown in FIG. 10 that is in the cab of a tow vehicle so that an operator can control the operation of the grain cart 10 from the cab of the tow vehicle. However, the control interface could also take other forms. On the controls interface 300 there is typically a plurality of buttons and/or switches that allow the operator of the tow vehicle to control the various functions of the grain cart 10. Among these various buttons on the control interface 300 is an auger out switch 302 that causes the auger assembly 80 on the grain cart 10 to fold out to the operation position, an auger in switch 304 that causes the auger assembly 80 to fold in to the transport position, a spout pivot front switch 306 that causes the spout 150 and the discharge assembly 140 to pivot towards the front of the grain cart 10, and a spout pivot rear switch 308 that causes the spout 150 and the discharge assembly 140 to pivot towards the rear of the grain cart 10.

Figure 10:
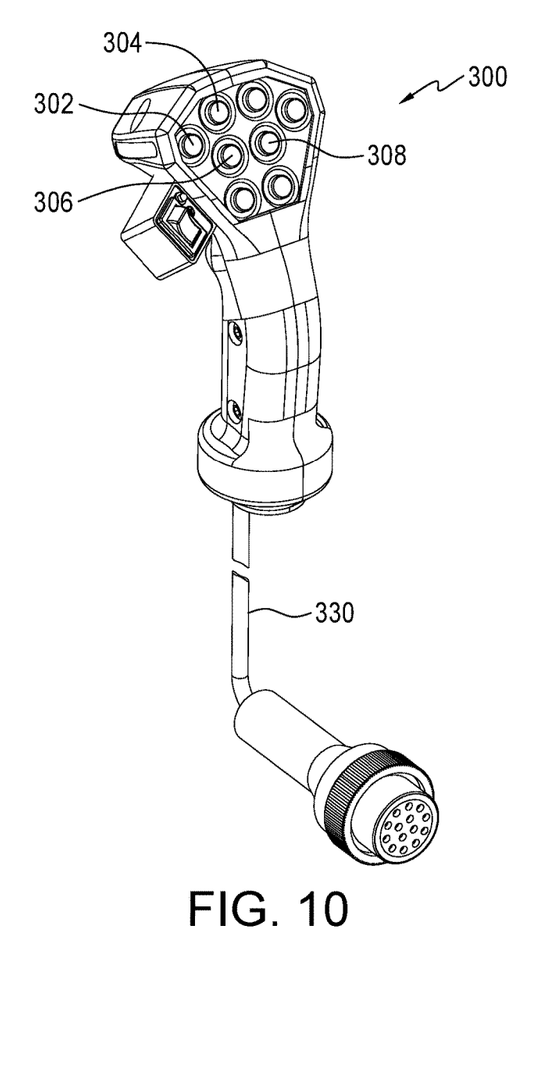
FIG. 10 is a perspective view of a control interface to control the operation of a grain cart.

Additionally, there can be a number of other buttons that control in and out movement of the spout 150, the moving up and down of the auger assembly 80, etc.

The buttons and switches are connected by wiring running through a control interface wiring harness 330 that connects to wiring in the grain cart 10.

Figure 11:
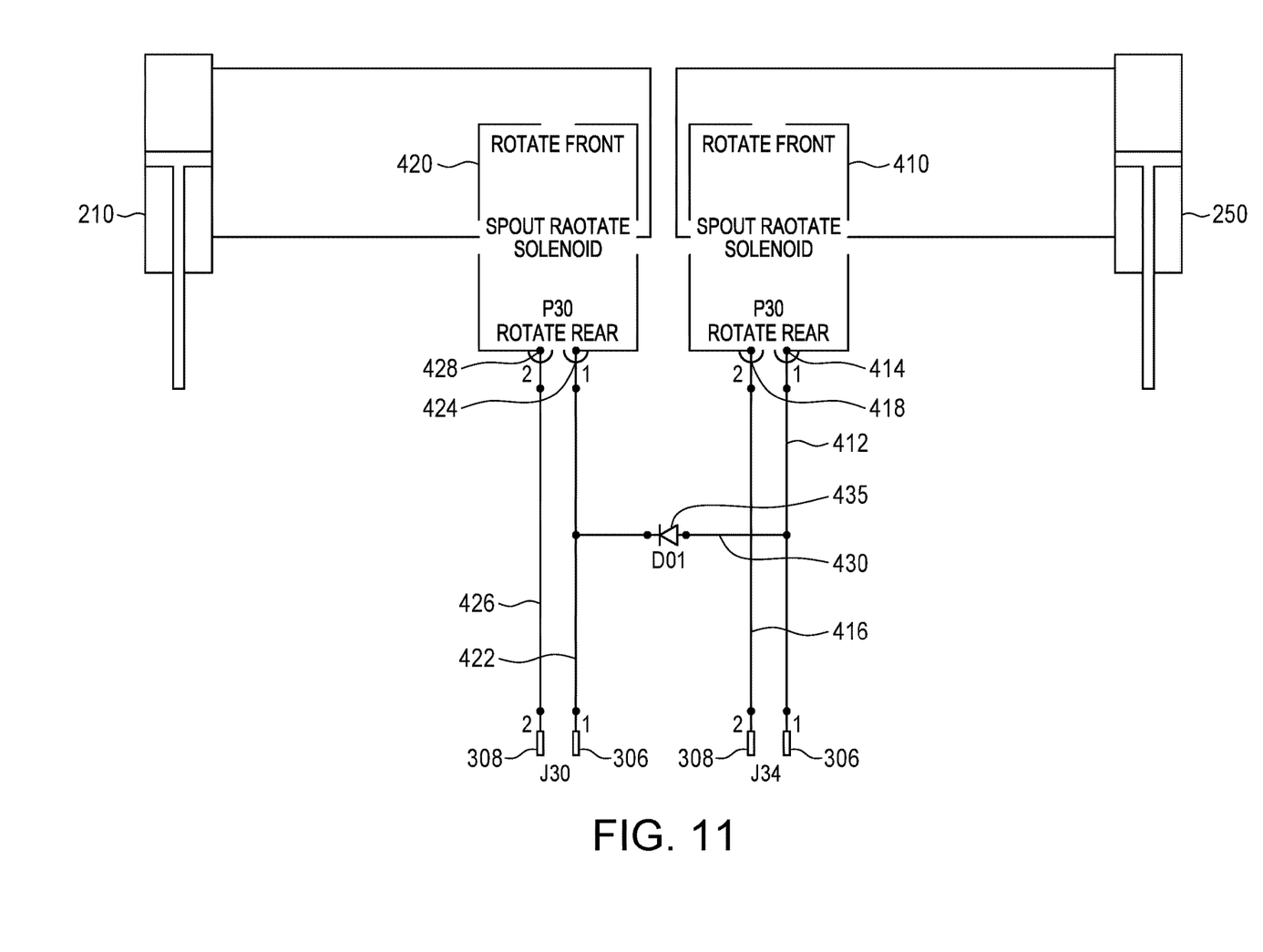
FIG. 11 is a schematic wiring diagram of electrical connections between the control interface and solenoids for the hydraulics on the grain cart.

FIG. 11 is a schematic wiring diagram of the electrical connections between the control interface 300 and specifically the electrical connections between the auger out switch 302, the auger in switch 304 and a double acting auger fold solenoid valve 410 and the electrical connections between the spout pivot front switch 306, the spout pivot rear switch 308 and a double acting spout pivot solenoid valve 420. The auger fold solenoid valve 410 can be used to control the flow of hydraulic fluid to the fold actuator 250 which will thereby cause the folding and unfolding of the auger assembly 80 between the operating and transport positions. The spout pivot solenoid valve 420 can be used to control the flow of hydraulic fluid to the pivot actuator 210 and thereby control the pivoting of the discharge end 140 and the spout 150 relative to the discharge end 124 of the upper auger section 120.

A first fold electrical connection 412 can be operatively connected between the auger in switch 304 and a first input connection 414 on the auger fold solenoid valve 410 (typically there will be a relay between the auger in switch 304 and the first fold electrical connection 412 so that 12 volts can be passed over the first fold electrical connection 412 but the control interface 300 does not need to have 12 volts or more running through it). When the auger in switch 304 on the control interface 300 is pressed by an operator in the cab of the tow vehicle, an electrical voltage can be supplied by the first fold electrical connection 412 to the first input connection 414 on the auger fold solenoid valve 410. This voltage will cause the auger fold solenoid valve 410 to provide hydraulic fluid to the fold actuator 250 that will cause the auger assembly 80 to fold in to the transport position.

A second fold electrical connection 416 can be operatively connected between the auger out switch 302 and a second input connection 418 on the auger fold solenoid valve 410 (again there will typically be a relay and other components between them so that a relatively low voltage can be used inside the control interface 300). An electrical voltage can be supplied by the auger out switch 302 to the second input connection 418 on the auger fold solenoid valve 410. This voltage will cause the auger fold solenoid valve 410 to provide hydraulic fluid to the fold actuator 250 that will cause the auger assembly 80 to fold out in to the operating position.

A first pivot electrical connection 422 can be operatively connected between the spout pivot front switch 306 and a first input connection 424 on the spout pivot solenoid valve 420. An electrical voltage supplied by the spout pivot front switch 306 to the first input connection 424 on the spout pivot solenoid valve 420 can cause the spout pivot solenoid valve 420 to direct hydraulic fluid to the pivot actuator 210 to pivot or rotate the discharge assembly 140 and the spout 150 in the first direction towards the front of the grain cart 10.

A second pivot electrical connection 426 can be operatively connected between the spout pivot rear switch 308 and a second input connection 428 on the spout pivot solenoid valve 420. An electrical voltage supplied by the spout pivot rear switch 308 to the second input connection 428 on the spout pivot solenoid valve 420 through the second pivot electrical connection 426 can cause the spout pivot solenoid valve 420 to direct hydraulic fluid to the pivot actuator 210 to pivot or rotate the discharge assembly 140 and the spout 150 in the second direction, opposite the first direction and towards the back of the grain cart 10.

A cross-over electrical connection 430 can be connected between the first fold electrical connection 412 and the first pivot electrical connection 422. When an operator uses the auger in switch 304 to fold the auger assembly 80 into the transport position, an electrical voltage is supplied by the first fold electrical connection 412 to the first input connection 414 on the auger fold solenoid valve 410. The voltage supplied to the first input connection 414 on the auger fold solenoid valve 410 using the first fold electrical connection 412 will also be supplied by the cross-over electrical connection 430 to the first pivot electrical connection 422 and thereby to the first input connection 424 on the spout pivot solenoid valve 420. In this manner, when an operator initiates the folding of the auger assembly 80 by using the auger in switch 304 on the control interface 300, the voltage supplied to the first input connection 414 on the auger fold solenoid valve 410 will also be supplied to the first input connection 424 on the spout pivot solenoid valve 420 across the cross-over electrical connection 430 and the first pivot electrical connection 422. This will cause not only the auger fold solenoid valve 410 to have the fold actuator 250 fold the auger assembly 80 into the transport position, but the voltage supplied across the cross-over electrical connection 430 to the first input connection 424 on the spout pivot solenoid valve 420 will also cause the spout pivot solenoid valve 420 to have the pivot actuator 210 rotate the discharge end 140 and the spout 150 in the first direction towards the front of the grain cart 10 so that the spout 150 is out of the way of the storage hopper 60 and will not hit the storage hopper 60 when the upper auger section 120 pivots past the storage hopper 60.

A recovery rectifier or diode 435 can be provided in the cross-over electrical connection 430 so that voltage can only travel in one direction from the first fold electrical connection 412 to the first pivot electrical connection 422 and not the other way around. In this manner, the auger assembly 80 will not be unfolded when an operator uses the spout pivot rear switch 308 because an electrical voltage will not be supplied back across the cross-over electrical connection 430 to the first fold electrical connection 412 because of the diode 435.

In this manner, when an operator uses the control interface 300 to fold the auger assembly 80 into the transfer position, the spout 150 will automatically be rotated out of the way of the storage hopper 60 so that the upper auger section 120 can be pivoted around the hinge 130 and more parallel with the lower auger section 120 without the spout 150 hitting the storage hopper 60. The operator does not have to proactively do anything to make sure the spout 150 is rotated out of the way, but rather, the spout 150 will be automatically rotated out of the way when the operator presses the auger in switch 304 and the auger assembly 80 is folded.

The cross-over electrical connection 430 can be provided on the grain cart 10 at the time it is manufactured. Alternatively, the cross-over electrical connection 430 can be installed at a later time on an existing grain cart 10 to upgrade the existing grain cart 10 so that the spout 150 automatically rotates out of the way of the storage hopper 60 when the auger assembly 80 is folded into the transport position. The cross-over electrical connection 430 can simply be provided between the spout pivot front switch 306 and a first input connection 424 already present on the grain cart 10.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A grain cart comprising:
    a frame;
    ground wheels rotatable attached to the frame;
    a hitch assembly attached to a front end of the frame;
    a storage hopper provided on the frame;
    an auger assembly operatively connected to the storage hopper to discharge particulate material from the storage hopper out of the grain cart, the auger assembly comprising:
        a lower auger section having an intake end and a top end;
        an upper auger section having a bottom end and a discharge end;
        a discharge assembly pivotally attached to the discharge end of the upper auger section;
        a spout provided on the discharge assembly;
        a pivot actuator connected to the discharge assembly to pivot the discharge assembly and the spout relative to the discharge end of the upper auger section;
        a pivot hinge pivotally connected to the upper auger section to pivot the upper auger section from an operating position coaxial with the lower auger section to a transport position with the upper auger section pivoted towards the lower auger section;
        a fold actuator operably connected to the upper auger section to pivot the upper auger section around the pivot hinge;
    an auger in switch;
    a spout pivot front switch;
    a first fold electrical connection electrically connected between the auger in switch and a fold solenoid valve, the fold solenoid valve operative, in response to an electrical voltage on the first fold electrical connection, to cause the fold actuator to pivot the upper auger section into the transport position;
    a first pivot electrical connection electrically connected between the spout pivot front switch and a spout pivot solenoid valve, the spout pivot solenoid valve operative, in response to an electrical voltage on the first pivot electrical connection, to cause the pivot actuator to pivot the discharge assembly towards a front of the grain cart; and
    a cross-over electrical connection electrically connecting the first fold electrical connection and the first pivot electrical connection,
    wherein when a voltage is supplied on the first fold electrical connection to the fold solenoid valve, the cross-over electrical connection supplies the voltage to the first pivot electrical connection and the first pivot electrical connection supplies the voltage to a spout pivot solenoid valve.

2. The grain cart of claim 1, wherein the upper auger section is pivoted around the pivot hinge to a position substantially adjacent to the lower auger section when the upper auger section is in the transport position.

3. The grain cart of claim 1 further comprising:
    an auger out switch;
    a spout pivot rear switch;
    a second fold electrical connection electrically connected between the auger out switch and the fold solenoid valve, the fold solenoid valve operative, in response to an electrical voltage on the second fold electrical connection, to cause the fold actuator to pivot the upper acuter section in to the operating position; and
    a second pivot electrical connection electrically connected between the spout pivot rear switch and the spout pivot solenoid valve, the spout pivot solenoid valve operative, in response to an electrical voltage on the second pivot electrical connection, to cause the pivot actuator to pivot the discharge assembly towards a rear of the grain cart.

4. The grain cart of claim 1 wherein the cross-over electrical connection comprises a diode only providing a voltage in one direction on the cross-over electrical connection, from the first fold electrical connection to the first pivot electrical connection.

5. The grain cart of claim 3 wherein the auger in switch, the spout pivot front switch, the auger out switch and the a spout pivot rear switch are provided on a control interface.

6. The grain cart of claim 5 wherein the control interface is a joystick.

7. The grain cart of claim 1 wherein the fold actuator is connected to a fold bracket attached to the upper auger section.

8. The grain cart of claim 1 wherein the pivot actuator is a hydraulic cylinder.

9. The grain cart of claim 8 wherein the fold solenoid valve controls hydraulic fluid routed to the fold actuator.

10. The grain cart of claim 1 wherein the fold actuator is a hydraulic cylinder.

11. The grain cart of claim 10 wherein the spout pivot solenoid valve controls hydraulic fluid routed to the pivot actuator.

12. The grain cart of claim 1 wherein the auger assembly is provided in front of the storage hopper.

13. A method of modifying a grain cart to automatically rotate a spout towards a front of the grain cart when an auger assembly is being folded into a transport position, the method comprising:

providing a grain cart having:
a first fold electrical connection electrically connected between an auger in switch and a fold solenoid valve, the fold solenoid valve operative, in response to an electrical voltage on the first fold electrical connection, to cause a fold actuator to pivot an upper auger section into a transport position; and
a first pivot electrical connection electrically connected between a spout pivot front switch and a spout pivot solenoid valve, the spout pivot solenoid valve operative, in response to an electrical voltage on the first pivot electrical connection, to cause a pivot actuator to pivot a discharge assembly containing a spout towards a front of the grain cart;
installing a cross-over electrical connection between the first fold electrical connection and the first pivot electrical connection to electrically connect the first fold electrical connection and the first pivot electrical connection.

14. The method of claim 13 wherein the cross-over electrical connection comprises a diode only providing a voltage in one direction on the cross-over electrical connection, from the first fold electrical connection to the first pivot electrical connection.

* * * * *